(12) United States Patent
Van De Poel et al.

(10) Patent No.: US 9,614,914 B2
(45) Date of Patent: Apr. 4, 2017

(54) SYSTEM COMPRISING A PUBLISH/SUBSCRIBE BROKER FOR A REMOTE MANAGEMENT OF END-USER DEVICES, AND RESPECTIVE END-USER DEVICE

(71) Applicant: THOMSON LICENSING, Issy de Moulineaux (FR)

(72) Inventors: Dirk Van De Poel, Aartselaar (BE); Patrick Goemaere, Brecht (BE); Kurt Jonckheer, Antwerpen (BE)

(73) Assignee: THOMSON LICENSING, Issy Lew Moulineaux (FR)

( * ) Notice: Subject to any disclaimer, the term of this patent is extended or adjusted under 35 U.S.C. 154(b) by 0 days.

(21) Appl. No.: 14/356,904

(22) PCT Filed: Nov. 15, 2012

(86) PCT No.: PCT/EP2012/072694
§ 371 (c)(1),
(2) Date: May 8, 2014

(87) PCT Pub. No.: WO2013/072404
PCT Pub. Date: May 23, 2013

(65) Prior Publication Data
US 2014/0286354 A1    Sep. 25, 2014

(30) Foreign Application Priority Data
Nov. 18, 2011   (EP) .................................... 11447027

(51) Int. Cl.
*H04L 12/66* (2006.01)
*H04L 29/08* (2006.01)
(Continued)

(52) U.S. Cl.
CPC ............ *H04L 67/141* (2013.01); *G06F 9/542* (2013.01); *H04L 41/0213* (2013.01);
(Continued)

(58) Field of Classification Search
CPC .............................. H04L 67/141; H04L 67/34
(Continued)

(56) References Cited

U.S. PATENT DOCUMENTS 6,393,458 B1    5/2002   Gigliotti
6,779,184 B1    8/2004   Puri et al.
(Continued)

FOREIGN PATENT DOCUMENTS

CN    101848236    5/2010
CN    101964958    2/2011
(Continued)

OTHER PUBLICATIONS

Fette et al The WebSocket Protocol_draft-ietf-hybi-thewebsocketprotocol-17_30SEP2011_Page1_Google Inc.
(Continued)

*Primary Examiner* — Sai-Ming Chan
(74) *Attorney, Agent, or Firm* — Brian J. Dorini; Jerome G. Schaefer

(57) ABSTRACT

The present invention provides a method for sending a message to a network device with a specific MAC address, in an IP network implementing a internet group management protocol IGMP, comprising: sending, by a network terminal, to the network device, a multicast group management status message including a destination address set as the specific MAC address A system comprises a multitude of end-user devices coupled via a broadband connection with a service provider network, a publish/subscribe broker adapted to communicate with the multitude of end-user devices and at least a first back-end entity coupled with the service provider network. The first back-end entity includes a first client software application for connecting to the publish/subscribe
(Continued)

broker and publishes control data via a control data channel for a device management of the end-user devices. The end-user devices include a second client software application for connecting to the publish/subscribe broker for subscribing to the control data channel and for receiving the control data, and for publishing device data and action data as instructed by the control data. The backend entity authorization is validated in particular by using a control data signature.

20 Claims, 4 Drawing Sheets

(51) Int. Cl.
G06F 9/54 (2006.01)
H04L 12/24 (2006.01)
(52) U.S. Cl.
CPC ........ *H04L 41/0273* (2013.01); *H04L 41/082* (2013.01); *H04L 67/34* (2013.01); *G06F 2209/544* (2013.01)
(58) Field of Classification Search
USPC ........................................................ 370/463
See application file for complete search history.

(56) References Cited

U.S. PATENT DOCUMENTS

| 7,650,347 | B2* | 1/2010 | Mankovski | G06F 9/5027 |
| | | | | 705/7.15 |
| 7,797,382 | B2 | 9/2010 | Bou-Diab | |
| 2004/0073566 | A1 | 4/2004 | Trivedi | |
| 2005/0216555 | A1* | 9/2005 | English | G06Q 50/18 |
| | | | | 709/204 |
| 2010/0153434 | A1* | 6/2010 | Erickson | G06Q 30/0269 |
| | | | | 707/769 |
| 2010/0235433 | A1 | 9/2010 | Ansari et al. | |
| 2010/1235433 | | 9/2010 | Ansari et al. | |
| 2011/0185074 | A1 | 7/2011 | Pardo-Castellote et al. | |

FOREIGN PATENT DOCUMENTS

| EP | 2003843 | 6/2011 |
| KR | 20110024387 | 3/2011 |
| WO | WO2010127327 | 11/2010 |

OTHER PUBLICATIONS

Russel,A_et al, The Bayeux Specification—Bayeux Protoco11.0.0_The Dojo Foundation, Jan. 1, 2007.
Flatin,J_Push vs. Pull in Web-Based Network Management_EPFL Lausanne, Switzerland, Oct. 1, 1998.
Corasaro, A et al_Scaling the Data Distribution Sevice to Global Networks_PRISMTECH, Jan. 1, 2009.
Search Rept:Feb. 25, 2013.
Broadband Forum—Technical Report—TR-181 Device Data Model for TR-069—Issue-2—May 2010.
Broadband Forum—Technical Report—TR-069—CPE WAN Management Protocol v1.1—Issue 1—Amendment 2—Dec. 2007.

* cited by examiner

SYSTEM COMPRISING A PUBLISH/SUBSCRIBE BROKER FOR A REMOTE MANAGEMENT OF END-USER DEVICES, AND RESPECTIVE END-USER DEVICE

This application claims the benefit, under 35 U.S.C. §365 of International Application PCT/EP2012/072694, filed Nov. 15, 2012, which was published in accordance with PCT Article 21(2) on May 23, 2013 in English and which claims the benefit of European patent application No. 11447027.1, filed Nov. 18, 2011.

TECHNICAL FIELD

The invention relates to the field of end-user devices, in particular to remotely managed Internet connected end-user devices such as customer premises equipment devices operating via a broadband connection with a service provider network.

BACKGROUND OF THE INVENTION

Customer premises equipment (CPE) devices are for example residential gateways, routers, switches, telephones, set-top boxes, etc. Residential gateways are nowadays widely used to connect devices in a home of a customer to the Internet or to any other wide area network (WAN). Residential gateways use for example digital subscriber line (DSL) technology that enables a high data rate transmission over copper lines, or use optical fiber broadband transmission systems, for example fiber-to-the-home (FTTH) and fiber-to-the premises (FTTP).

Network service providers (NSP), also some Internet service providers (ISP), may have to manage a large amount, up to millions, of CPE devices that they deployed as part of their service, e.g. for broadband Internet access or IPTV. Remote management of CPE devices can be achieved by means of a central configuration server (CCS), which interacts with individual CPE devices to provide them with configuration settings and to extract diagnostics information by using a specific application layer protocol.

A widely used example of a CPE remote management communication protocol is known as the CPE WAN management protocol (CWMP), which was developed by the Broadband Forum and defined by a technical report number 069, also commonly referred to as TR-069. The CWMP defines an application layer protocol for remote management of CPE devices, by providing a communication protocol between the CPE devices and an auto configuration server (ACS).

A wide area network of this kind providing broadband services for CPE devices is schematically shown in FIG. 1: a network service provider network 1 is arranged for providing Internet services to a multitude of residential gateways 2 and set-top boxes 3 via a broadband connection 5, e.g. DSL/Cable/Fibres, . . . . In addition, the NSP network 1 includes an ACS 4 for remotely managing the residential gateways 2 and set-top boxes 3. By using the TR-069 protocol, the ACS 4 is capable for example of auto configuration and dynamic service provisioning, software/firmware image management, status and performance monitoring and diagnostics for the residential gateways 2 and set-top boxes 3.

CWMP, also other protocols such as for example OMA Device Management or web service based protocols, work in a "traditional" client/server and request/response model.

A device acting as a Hypertext Transfer Protocol (HTTP) client connects to one or a cluster of HTTP servers and sends a HTTP request, and the server or the cluster responds with a HTTP response. CWMP is correspondingly applying the same principles as the World Wide Web serving web (HTML) pages.

Recently, there are evolutions in scope of the upcoming HTML5 standard, see http://www.w3.org/TR/html5/, and there is a new web sockets protocol under definition: "http://tools.ietf.org/html/draft-ietf-hybi-thewebsocketprotocol-17" with contributions by the W3C. Web sockets support full duplex, bidirectional communication between a web socket client and server, going beyond the traditional request/response model, although there are intermediate non-standard mechanisms for a server to send data to clients, examples include comet: http://svn.cometd.com/trunk/bayeux/bayeux.html, http long poll . . . .

There are a number of significant constraints and problems with a fully centralized server containing all management related logic and the HTTP request/response model:

Scalability is a challenge in a centralized server model once millions of devices frequently connect to the server (sending requests) and helpdesks and other entities need to go through the server for a number of applications (monitoring, diagnostics . . . ), As fast as possible communication from the ACS or another backend application to a particular device is problematic. E.g. TR-069 defines a connection request mechanism in which the ACS sends a HTTP request to the CPE and authenticates, typically using HTTP digest authentication, after which the CPE device connects to the ACS sending HTTP requests, Interrogation of a large number of CPE devices requires the central server to contact each and individually go through request/response iterations to collect the data and analyze these collected data on server side, All logic is centralized in one place, e.g. the ACS server, meaning:
  The ACS server needs to issue commands to devices over a potentially slow network connection.
  The ACS server needs to await response from a CPE device (success/failure and possibly requested data), analyze this result and based upon the result decide which next step to take.
  Perform this logic, which is typically common for a very large number of CPE devices, for each individual CPE device.

US 2010/0235433 A1 describes a service management system communicating via a wide area network with gateway devices at various user premises, to remotely manage delivery of application services and/or features thereof by the gateway device based on service subscriptions of customers associated with the gateway devices. A subscription manager provides information through the WAN identifying the application services or features to be enabled, to each respective gateway device. A service manager controlled by the subscription manager distributes service specific configuration data to logic implementing service functionality for the application services in the gateway devices, responsive to requests from the gateway devices.

The publication "Push vs. Pull in WEB-Based Network Management" by Jean-Philippe Martin-Flatin, Lausanne, Switzerland, Technical Report SSC/1998/022, describes Network Management application designs. A first, a pull model, is based on a request/response paradigm. A second, a push model, relies on the publish/subscribe paradigm, which allows administrators to conserve network bandwidth as well as CPU time on the management station. A third model introduces the concept of a collapsed network management platform, wherein the above two models coexist.

SUMMARY OF THE INVENTION

The system comprises a multitude of end-user devices coupled via a broadband connection with a service provider network, a publish/subscribe broker adapted to communicate with the multitude of end-user devices and at least a first back-end entity coupled with the service provider network. The first back-end entity includes a first client software application for connecting to the publish/subscribe broker and publishes control data via a control data channel for a device management of the end-user devices. The end-user devices include each a second client software application for connecting to the publish/subscribe broker and for subscribing to the control data channel and for receiving the control data, and also for publishing device data and action data as instructed by the control data. The backend entity authorization is validated in particular by using a control data signature.

In a preferred embodiment, the service provider network is a network for providing Internet services, e.g. a network service provider network, and provides the device management of the end-user devices, and the publish/subscribe broker is also provided by the network service provider operating the network service provider network. Each end-user device in particular subscribes to at least one control data channel for receiving management commands for its device management and each end-user device publishes its device data via a device data channel and action data via an action data channel.

In a further aspect of the invention, the system includes a second backend entity having a third client software application for connecting to the publish/subscribe broker, which subscribes to device data, control data and action data of the end-user devices to maintain an inventory of the multitude of end-user devices, but does not publish control data for the end-user devices. The second back-end entity is for example a server provided by the manufacturer of the end-user devices and the first back-end entity a server provided by the network service provider.

The device management includes in particular upgrading to a new firmware or middleware version, installing, updating or uninstalling of a software application, executing a program or script file, executing a structured query on the end-user device configuration or on status data, providing a policy on which data the end-user device needs to publish, or resetting or rebooting the end-user devices.

End-user devices adapted for an operation with the system are in particular CPE devices, e.g. residential gateways and set-top boxes, and also smart phones, cell phones, tablet PCs, smart TVs and other remotely managed network or Internet connected appliances.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

In the following description, a system comprising a multitude of end-user devices coupled via a broadband connection with a service provider network is described. For purposes of explanation, numerous specific details are set forth in order to provide a thorough understanding of preferred embodiments. It will be evident, however, to one skilled in the art that the present invention may be practiced without these specific details.

The end-user devices are in particular CPE devices, for example residential gateways, routers, switches and set-top boxes, and also any other network or Internet connected appliances, and include each a microprocessor, a non-volatile memory, in which an operating system and applications are stored, and a volatile memory for the operation of the CPE device. The operating system of a CPE device is for example a LINUX operating system and a CPE device-specific middleware, which represents a device execution environment. The device execution environment includes software components for providing e.g. a DSL modem function, gateway and switching functions, FXS functions, VoIP functionality and Wi-Fi operation.

Figure 2:
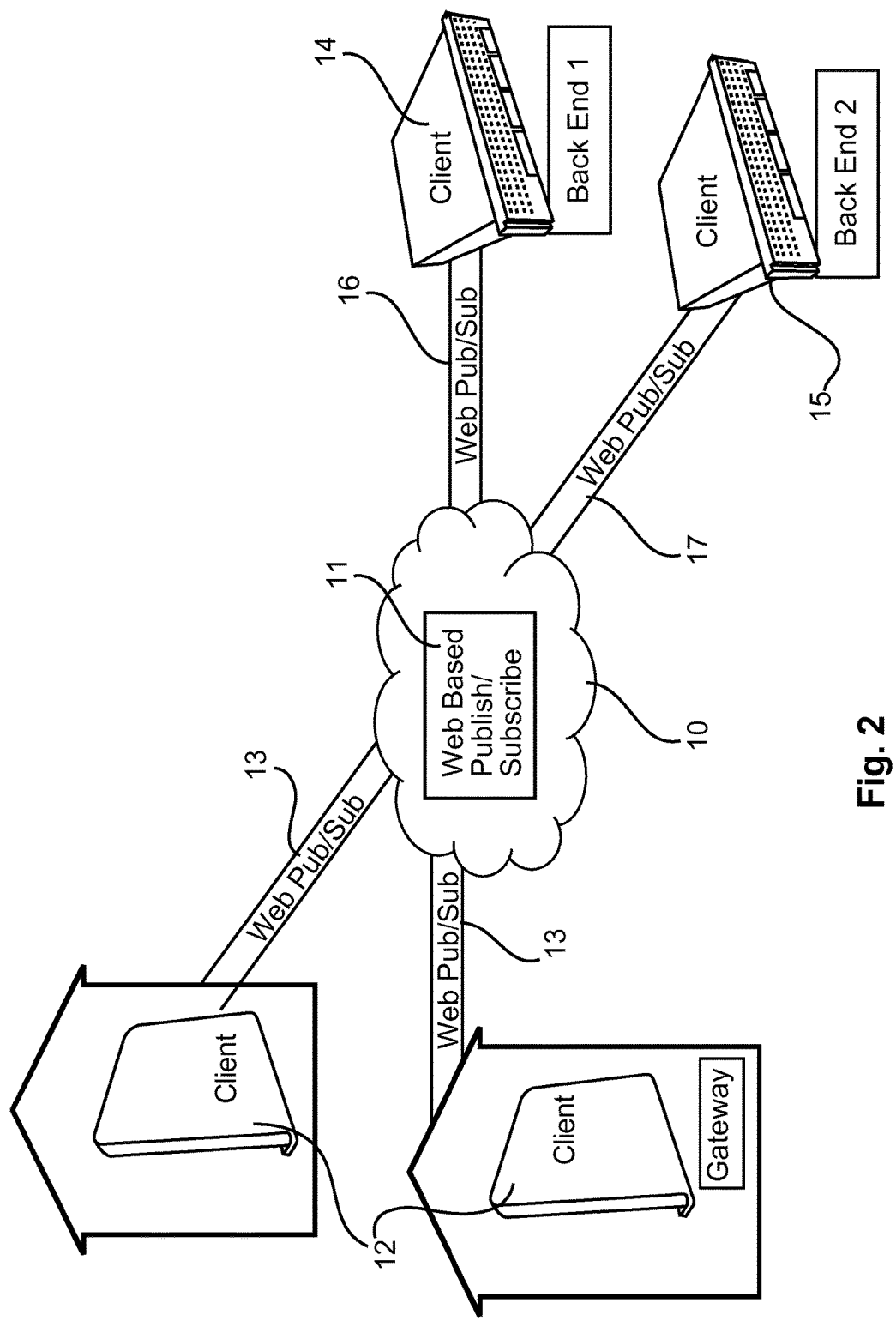

The system according to the invention includes in a preferred embodiment, depicted in FIG. 2, a multitude of CPE devices 12 coupled each via a broadband connection 13 with a service provider network 10, in particular a network service provider (NSP) network, and a publish/subscribe broker 11 adapted to communicate with the multitude of CPE devices 12. The system includes further at least a first back-end entity 14 coupled via a broadband connection 16 with the service provider network, which back-end entity 14 includes a client software application for connecting to the publish/subscribe broker 11 for a remote CPE device management of the CPE devices 12. The publish/subscribe broker 11 is for example a part of the NSP network 10 or is provided by an Internet service provider and is managing in particular communication and control services for the CPE devices 12 for the remote CPE device management of the CPE devices 12. The publish/subscribe broker 11 could also be hosted on a cloud platform located in a datacenter outside of the NSP network 10 or an Internet service provider network. The CPE devices 12 include also a client software application for connecting to the publish/subscribe broker 11 and are therefore devices "under management" of the publish/subscribe broker 11 and the back-end entity 14. The CPE devices 12 subscribe to one or several specific topics, e.g. one or several control channels, and publish data on one or several specific topics, e.g. data channels.

Also any further back-end entity 15 connected with the publish/subscribe broker 11 via a broadband connection 17 includes a client software application for connecting to the publish/subscribe broker 11, to provide or support a CPE device management of the CPE devices 12. The back-end entities 14 and/or 15 publish control data on specific topics, e.g. control channels, and subscribe to specific topics, e.g. data channels, depending on the specific application or use-case.

The back-end entities 14 and 15 may be implemented in different technologies, e.g. different software programming languages, and be located on the same server or on different servers and places, e.g. any place in the world with Internet connectivity. Similar to other devices they will communicate over the Internet through the publish/subscribe broker 11. The invention supports in particular one, two or any number of back-end entities residing in any place.

In a publish/subscribe system, publishers post messages to an intermediary message broker, the publish/subscribe broker 11, and subscribers register subscriptions with that broker, wherein the broker performs the forwarding and filtering of published messages. The broker normally is optimized to perform a store and forward function to route messages from the publishers to the subscribers in an as efficient as possible manner. A message broker is described for example in http://en.wikipedia.org/wiki/message_broker. The publish/subscribe mechanism enables one to one, one-to-many and many-to-many communication in between loosely coupled entities. Loosely coupled means in the context of the invention that they don't need to know about each other's presence or location. The broker will authenticate each client, CPE device or backend entity, and impose authorization constraints on which backend entity is allowed to subscribe to and receive which messages, as published on certain channels.

The publish/subscribe mechanism is used for example also by the data distribution service (DDS) provided by the object management group (OMG), which enables scalable real-time high performance and inter-operable data extensions between publishers and subscribers. Another example is the Message Queue Telemetry Transport (MQTT) protocol, an open protocol specification published by IBM. The invention does not depend on a particular publish/subscribe technology.

By using the publish/subscribe broker 11, several or even any number of backend entities 14, 15 having each a client software application for connecting to the publish/subscribe broker 11 can be used for managing the CPE devices 12. This solution is in particular more scalable and more cost effective than the current reference standards, such as the TR-069 CWMP or OMA DM protocols. The publish/subscribe broker 11 may use for example a service similar to Pusher, http://pusher.com, which is a simple hosted API for quickly, easily and securely adding real-time bi-directional functionality to Web applications, Beaconpush, http://beaconpush.com, PubNub, http://www.pubnub.com, a MQTT broker or Ultra large scale Distributed Data Services (DDS), http://www.omg.org/news/meetings/GOV-WS/pr/rte-pres/ultra-large-scale-dds.pdf.

The system operates as follows:
1. Each CPE device 12 connects in a first step to a web based publish/subscribe infrastructure, the publish/subscribe broker 11 (web based means that the broker is reachable via the Internet):
   a. A client software application, which is running on each CPE device 12 on startup of the CPE devices 12, establishes a connection, e.g. via TCP, a publish/subscribe protocol, to the publish/subscribe broker 11 by using a (pre) configured uniform resource locator (URL). The client software application authenticates and may need to provide a Transport Layer Security (TLS) certificate to allow the publish/subscribe broker to validate the client identity.
   b. The CPE device 12 may publish its device data on a pre-configured channel/topic, e.g. a device data channel.
      i. The device data include in particular serial number, hardware version, software version, current public (Internet) IP address, etc.
      ii. Any backend entity 14, 15 may subscribe to the device data, e.g. a backend entity comprising a backend device inventory application which stores together with their device data which CPE devices are connected together.
      iii. The device data may be periodically published by each CPE device 12 on particular events, for example on a startup or any change of software version or IP address.
   c. The CPE devices 12 further subscribe to one or more control channels or topics.
      i. The channels/topics on which they subscribe are either pre-configured, determined by previously received control data or determined by other criteria.
         1. Channel subscription can be per NSP, regional, per subscriber group so that control data targets customers of a particular NSP possibly in a specific region or subscribed to specific services
         2. Channel subscription can change over time, e.g. NSP customers with a given CPE product (hardware version) and software version could subscribe to a specific channel/topic for control data instructing to upgrade. For example, residential gateway or set-top box devices could subscribe to a <NSP-HW-SW> channel so that control data published on that channel can mass upgrade these CPE devices 12 to a new firmware/software version. After the upgrade, each CPE device 12 could subscribe to a <NSP-HW-SW2> channel listening for new upgrade control data.
         3. Using selective channel/topic subscriptions, the large set of CPE devices 12 can be partitioned for specific remote management applications so that published data targets specific sets of CPE devices 12.
      ii. The publish/subscribe broker may refuse CPE devices 12 to subscribe to a particular channel/topic based upon a configurable policy.
2. The backend entity 14 and/or 15 publishes control data on a specific control channel or topic:
   a. One or more backend entities 14 15 can publish control data on a specific control channel/topic. Unlike traditional centralized CWMP servers, the publish/subscribe mechanism enables loosely coupled communication: one to one, one to many, many to many. Having separate backend entities 14, 15 can avoid the need for central bottlenecks, e.g. around scalability.
   b. Each backend entity 14, 15 may need to authenticate to the web publish/subscribe infrastructure, publish/subscribe broker 11, to be allowed to publish control data.
   c. The control data may contain different data fields, for example, but not limited to:
      i. Target CPE devices: an optional restriction on the subscribing CPE devices that need to apply the control action. This restriction may be expressed in the form of a set of CPE device characteristics, e.g. HW/SW version, IP address range, serial number range . . . , or subscriber characteristics, e.g. set of ppp credentials, VoIP phone number (range), active services . . . .
      ii. Action: action to be performed by the CPE devices 12. Example actions included, but are not limited to:
1. Firmware upgrade
2. Application install/update/uninstall
3. Execute a program or a script file
4. Publish: unconditionally publish CPE device data or fixed data on a device or data channel or topic
5. Query: provide a structured query on CPE configuration data or status data (only when the query has results there are to be published by the CPE device)
6. Reboot iii. URL: optional URL pointing to a file. This may only apply for particular actions, e.g. for a firmware upgrade, the URL points to the firmware image to download and apply, for an execution as the action, the URL points to the software program or script file to download and execute.

iv. Data channel: the channel/topic name on which to publish the result of the action. May optionally be an URL to which to publish the result data of the action using traditional HTTP request/response web services, e.g. HTTP POST to this URL with JavaScript Object Notation (JSON) encoded data.

v. Timing related criteria: optional timing restrictions, for example, but not limited to:
1. Interval between performing recurring actions, e.g. interval for periodic execution of a script for monitoring reasons, a value of 0 could indicate that the action is one-time and non-recurring
2. A relative delay, e.g. fixed or random range, prior to performing the action
3. Absolute time range within which to perform the action, for example the same day between 2 am and 4 am vi. Security signature: The signature of a message is a key element of the invention to provide the needed level of security in a distributed approach with possibly multiple backend entities 14 and 15. A central authority will grant backend entities the right to perform certain management functionality, by adding extension fields containing the allowed functionality to the backend entity digital certificate, e.g. X.509, and signing it with its own certificate. Client devices embed the central authorities certificate's public key and for each received message validate whether the certificate that signed the message has the proper management rights and was signed by a central authority.

3. Each CPE device 12 having subscribed to the publish/subscribe broker 11 and receiving control data from any of the backend entities 14, 15 performs the requested action:
a. The first step is to verify origin, authenticity and integrity of the control data:
i. The control data can contain for example a signature, an asymmetric key encrypted hash over the control data message.
ii. The certificate private key used to sign the message (corresponding to a backend entity) contains the proper management rights in its extension fields and is validated using a pre-provisioned public key of the central authority which is stored on the CPE devices 12.
b. The second step is to validate the optional target CPE device constraints to assess whether the CPE device 12 should in fact perform the action. If the CPE device 12 is not covered by the target constraints, then the control data message is discarded without further action.
c. The action determines whether or not some of the optional control data fields are significant. The CPE device 12 performs the action taking optional timing constraints into account, for example, but not limited to:
1. Firmware upgrade: download the firmware image at a location URL (the URL contains the protocol to be used as a schema) and flash/apply the firmware followed by a reboot of the device.
2. Application install/update/uninstall: download the application binary to install or uninstall a particular application on the device, identified by the URL e.g. with file://schema.
3. Execute a program or script file: download the program or script file at the URL location, and execute the program or script file.
4. Publish: unconditionally publish CPE device data or fixed data on a device data channel or topic.
5. Query: structured query on CPE device configuration or status data of the CPE devices 12, (only when the query has results there are to be published by the CPE devices).
6. Reboot: a warm reset or restart of the CPE devices 12.

4. The CPE devices 12 can publish the results of the action on an action data channel or topic:
a. Which data depend on the particular action, for example, but not limited to:
1. Firmware upgrade: the result data may be a failure fault code. In case of success, the device may republish the device data (ref. step 1.b).
2. Application install/update/uninstall: the result data may be success or failure indications.
3. Execute a program or script file: the result data may be any data that is the result of the program or script execution. It may e.g. be monitoring data, diagnostics result codes, results of specific queries, aggregated data . . .
4. Publish: CPE device data or fixed data
5. Query: the query may or may not have results, the result data depend on the actual query, which is performed for example against CPE configuration data and/or status data; e.g. referencing a standard gateway data model such as a broadband forum TR-181i2 data model
6. Reboot: no result data, e.g. after reboot, the CPE may republish its device data.

b. The data channel or topic to publish the data on is determined by the initial control data that triggered the action:
i. The data channel or topic may be different for each action, this is completely determined by the backend administrator that administrates the control data,
ii. One or more backend entities 14, 15 may be interested in and subscribe to action data channels or topics.

5. The CPE devices 12 may receive new control data, on the control channel or topic on which they are subscribed, with a new action to perform.

Figure 3:
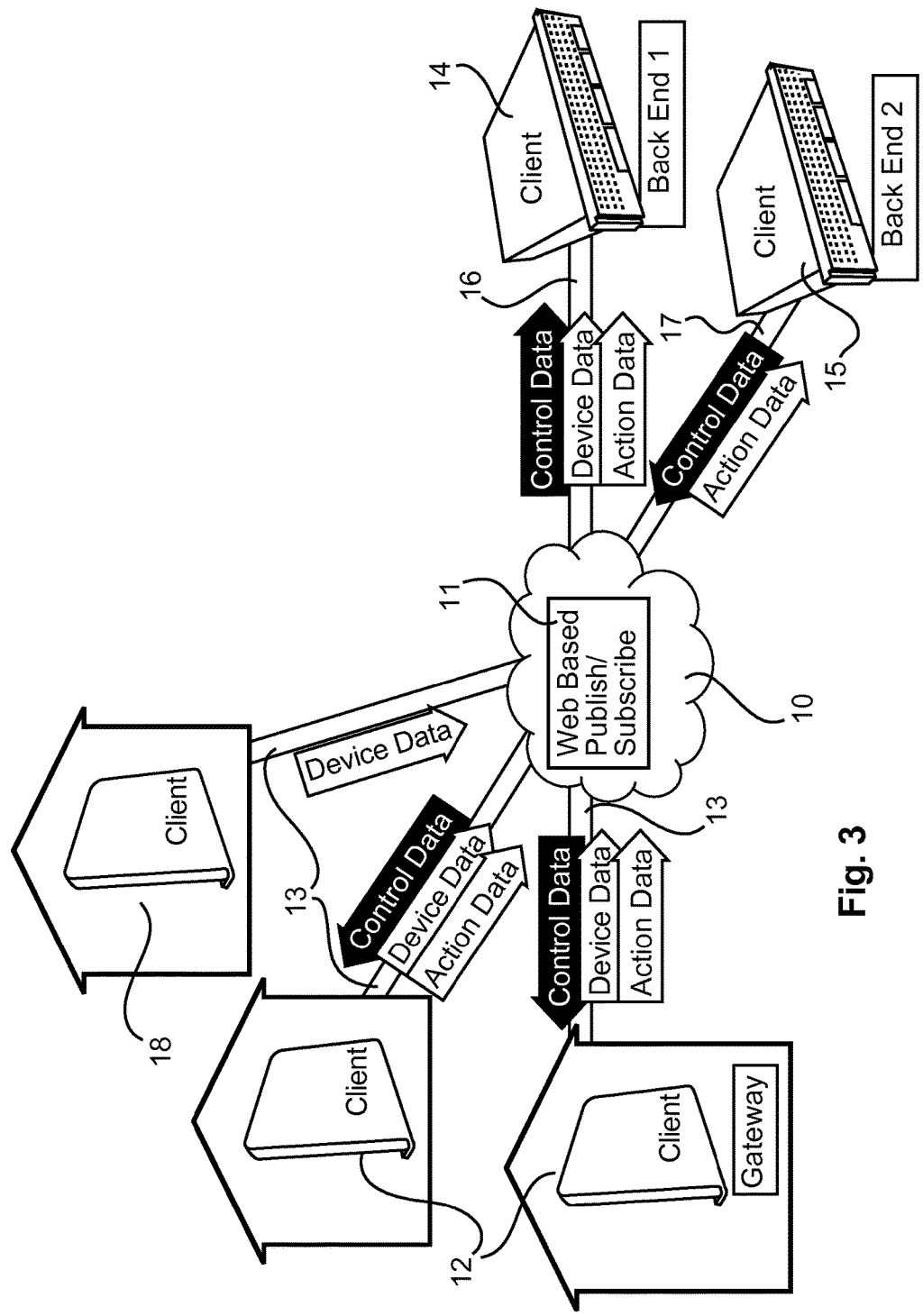

A more detailed embodiment of the system is shown in FIG. 3. This system includes a multitude of CPE devices 12 and 18, which are each coupled via the broadband connection 13 with the service provider network 10, and with the Internet. The system comprises further the publish/subscribe broker 11, which may be located within the service provider network 10, e.g. the NSP network, or somewhere in the Internet. The system may include millions of CPE devices 12, each having a client software application for a connection with the publish/subscribe broker 11, for the CPE device management of the CPE devices 12. Each of the CPE devices 12 subscribe to one or more control channel(s) of the publish/subscribe broker 11 to receive control data and each of the CPE devices 12 publish data on a data channel, e.g. a device data channel and an action data channel, via which the CPE devices 12 can send their device data, for example hardware and software data, IP-address, etc.

The system includes further first and second backend entities 14, 15, which are also connected with the publish/subscribe broker 11. In a preferred embodiment, both backend entities 14, 15 subscribe to the data channel of the CPE devices 12, so that they are aware, which CPE devices 12 are installed and currently active. In another example embodiment, only the backend entity 14 subscribes to device data, because it just as example maintains an inventory of all CPE devices 12 and stores the most essential information of the CPE devices 12, e.g. hardware and software data, when CPE devices 12 published data, which control action they performed, etc. The backend entity 15 is coupled with the publish/subscribe broker 11 via a control data channel and an action data channel. Via the control data channel, the backend entity 15 is able to an send execute action including an URL to the CPE devices 12, which URL points to a program or a script to be executed by the CPE devices 12.

The backend entity 14 subscribes to the control data channel, the device data channel and the action data channel, as provided by the publish/subscribe broker 11, to receive the control data from the backend entity 15 and the device and action data of the CPE devices 12.

These are just examples of how two or multiple backend entities can subscribe to parts or all of the channels/topics and messages according to their logic or needs. A particular backend entity can subscribe to specific channel parts to only publish to or receive messages from devices from a certain NSP, in a certain region . . . . Backend entities can also be dynamically added to the system or removed while keeping all other functionality intact.

In the above examples, the CPE devices 12 in particular subscribe to the control data channel as provided by the publish/subscribe broker 11, and publish device and action data via a device data channel and an action data channel to the publish/subscribe broker 11. The CPE devices 12 therefore receive any action data via the control data channel, as provided by the backend entity 15, download a program or script, as instructed by the control data and execute it. After execution of the program or script, the CPE devices 12 publish the result as action data on the action data channel, which information is forwarded by the publish/subscribe broker 11 to the first and second backend entities 14, 15. The backend entity 15 is for example a server of the network service provider, which uses the control data to track the progress of the actions of the CPE devices 12, and the backend entity 14 is for example a server of the vendor of the of the CPE devices 12, which track the operation of the CPE devices 12 and stores the information of which CPE device 12 has completed the action.

The CPE device 18 publishes only device data via a device data channel to the publish/subscribe broker 11, because the CPE device 18 belongs to a different network service provider and is not controlled by the backend entity 15. The CPE devices 12 are in particular provided by the same network service provider and/or are a part of an NSP network.

Figure 1:
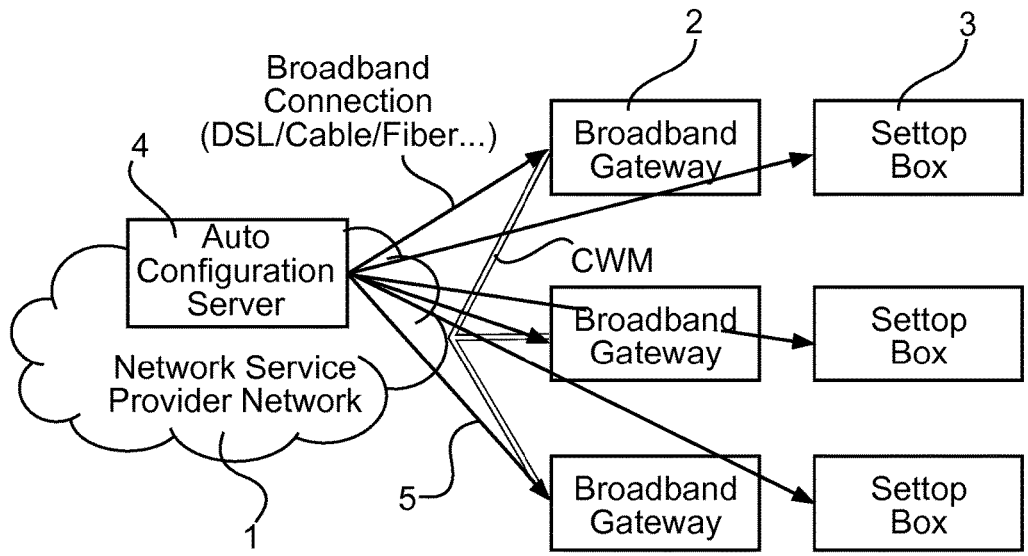
FIG. 1 a wide area network according to prior art, including CPE devices and a network service provider network for providing Internet services, FIG. 2 a system comprising a multitude of end-user devices, a publish/subscribe broker, and two back-end entities according to the invention, FIG. 3 a preferred embodiment of the system of FIG. 2, FIG. 4 a method to perform an execute action of a backend entity as depicted in FIGS. 2 and 3, and FIG. 5 a method describing an exemplary operation of the system as depicted in FIG. 3.
Figure 4:
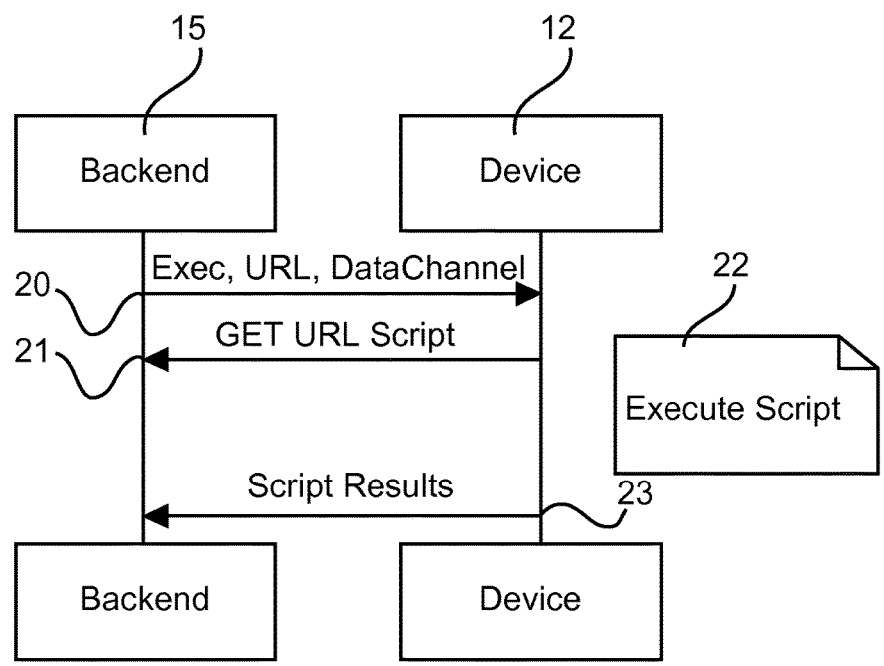

Via the execute action of the first backend device 15, for example a new software application can be installed on the CPE devices 12, or a firmware update can be performed for the CPE devices 12. A method to perform an execute action of the backend entity 15 is now described schematically with regard to FIG. 4, which illustrates the data flow between the backend entity 15 and the CPE devices 12. The backend entity 15 publishes control data for the CPE devices 12 via the control data channel to the publish/subscribe broker 11, which forwards the control data to the CPE devices 12, for example by sending an execute action including an URL, step 20. The execute action is for example a JavaScript Object Notation (JSON) message of the following kind: {"ctrl":{"action":"exec","key":"45335435".,"url":https://username:password@tchbackend.com/files/sdghsdg.lua, "data": "dsdghf321", "target":"*"}, "signature": "<base64encoded signature over ctrl data>"}. JSON is just one example of serializing the message, other examples include but are not limited to Extensible Markup Language (XML), ASN.1, Comma Separated Values . . .

In a further step 21, the CPE devices 12 download the script file as indicated in the JSON file and located at the URL. The script file is for example a Lua script file. The CPE devices 12 validate a control data signature as included in the script file, and whether it is signed by a trusted backend private key. For the validation, the basic or digest identification, e.g. username and password is requested via https from the URL: https://tchbackend.com/files/sdghsdg-.lua by using a HTTP Get command.

In case of a valid private key and signature, the CPE devices 12 execute this script, step 22. The script can perform any conditional or non-conditional interaction, e.g. make configuration changes, check status or statistics, retrieve statistics and aggregate them or check them for alarm thresholds, etc. The script results can be or include for example success, failure indication including a detailed fault code, status/statistics, specific query results and are published as action data on an action data channel to the publish/subscribe broker 11, which forwards the results to the backend entity 15, step 23.

Figure 5:
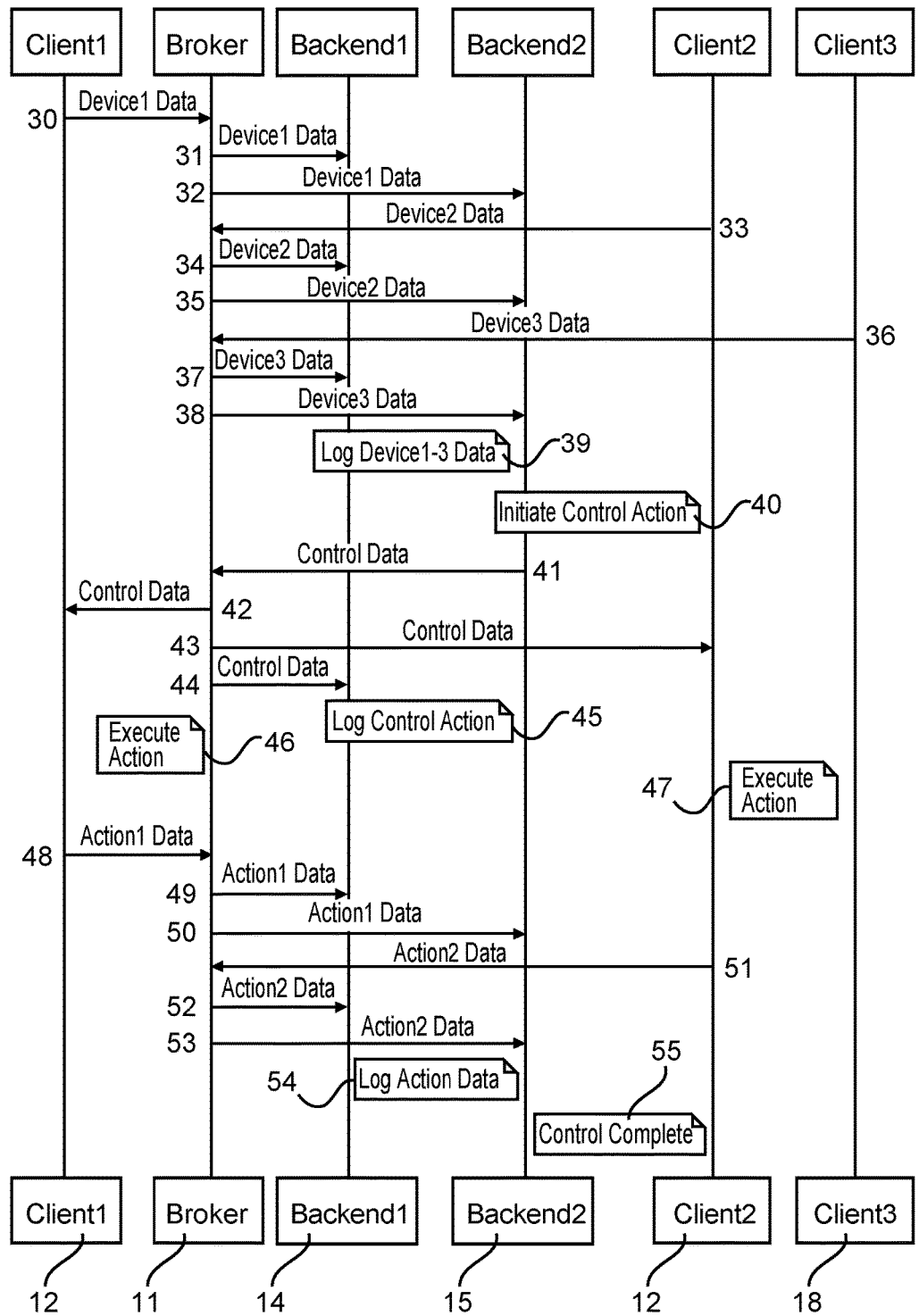

An exemplary operation of the system as described with regard to FIG. 3 is now explained with regard to FIG. 5. A first CPE device 12, client1, publishes its device data to the published subscribe broker 11, step 30. The publish/subscribe broker 11 forwards the device1 data to the first and second back-end entities 14, 15, backend1, backend2, steps 31, 32. In step 33, a second CPE device 12, client2, publishes its device data to the publish/subscribe broker 11, which forwards the device2 data correspondingly to the backend1 and backend2 servers 14, 15, steps 34, 35. Also the CPE device 16, client3, forwards its device data to the publish/subscribe broker 11, which forwards these device data to the backend1 and backend2 back-end entities 14, 15, steps 36-38. The backend entity 15 is in particular a server of the network service provider, and the backend entity 14 is a server of the vendor of the of the CPE devices 12. In step 39, the device data device1-device3 are logged in by the servers 14, 15.

In a further step 40, the backend2 server initiates a control action and publishes control data to the publish/subscribe broker 11, step 41. The publish/subscribe broker 11 forwards these control data to client1 and client2 CPE devices, steps 42, 43, but not to the client3 CPE device. The control data are also forwarded by the publish/subscribe broker 11 to the backend1 server 14, which logs the control data, steps 44, 45. In steps 46, 47, the control data are processed by the client1 and client2 CPE devices and executed, steps 46, 47.

When the client1 device has finished the action, it publishes the action data to the publish/subscribe broker 11, step 48, which forwards the action data to the backend1 and backend2 servers 14, 15, steps 49, 50. When the client2 device has finished and executed the action, it publishes its action data to the publish/subscribe broker 11, which forwards the action data to the backend1 and backend2 servers 14, 15, steps 51-53. The action data are logged in by the backend1 and backend2 servers, step 54, after which the execute action and control is completed, step 55.

The system as described with regard to FIG. 3 enables therefore a one to one, one to many and many to many communication between the publish/subscribe broker 11, the multitude of CPE devices 12 and one or several backend entities 14, 15. The back-end entities 14, 15 are in particular servers provided and/or managed by the network service provider of the NSP network 10, by any Internet service provider or by the vendor or the manufacturer of the CPE devices 12. The back-end entity 15 is for example a server provided by the network service provider and the back-end entity 14 a server provided by the manufacturer of the CPE devices 12.

The invention is not relying upon one specific publish/subscribe technology but adds inventive concepts for the end-user device management by possibly multiple backend entities to provide an alternative overall solution that is more scalable and cost-effective than the current industry reference protocols.

The system has the following advantages: This approach is more scalable, e.g. in terms of communication overhead, number of devices the back-end entity can support, than traditional centralized request/response based management approaches. It avoids any need for a back-end entity to depend on a central ACS. In addition, it supports one-to-one, one-to-many and many-to-many communication in a loosely coupled fashion with end-user devices and backend entities being able to reside anywhere.

The system supports also faster backend-to-device communication, because the back-end entity can send/publish data at any time, as compared with existing solutions like TR-069, in which case the ACS needs to send first a connection request to a CPE device, after which the CPE device connects to the ACS for a management session. The system allows further to distribute backend logic that is typically to be applied for a large number of CPE devices across the devices themselves (vs. centralized TR-069 ACS logic), significantly improving scalability because removing the need for costly communication to a central place (typically the ACS logic retrieves or updates data on a device, and based upon the result/outcome takes next steps . . . ).

The system further supports any number of backend entities, unlike a traditional central server, e.g. ACS, and supports a much wider range of management applications compared to current state of the art (TR-069, SNMP, OMA-DM). It supports also any underlying web publish/subscribe infrastructure (with centralized brokers, multicast based publish/subscribe . . . ). The CPE devices 12 may use in particular a middleware, based on a small scale data distribution service for their operation. A middleware of this kind can be easily adapted to operate with a publish/subscribe broker 11 via the publish/subscribe mechanism.

Also other embodiments of the invention may be utilized by one skilled in the art without departing from the scope of the present invention. The invention is in particular not limited to wide area networks using xDSL, DOCSIS or Fiber transmissions and is applicable also to any other wired or wireless broadband technology, for example TV distribution cable, any optical transmission, Broadband Over Powerline, WiMax or 3G wireless connectivity. The system as described may be used in particular for all kinds of network connected end-user devices such as CPE devices, e.g. residential gateways, routers, switches, telephones and set-top boxes, and consumer electronics devices, e.g. cell phones or smartphones, tablet PCs, and smart TVs. The invention resides therefore in the claims herein after appended.

The invention claimed is:

1. A system comprising a multitude of end-user devices coupled via a broadband connection with a service provider network, wherein the system comprises further:
    a publish/subscribe broker adapted to communicate with the multitude of end-user devices and at least a first back-end entity coupled with the service provider network, the first back-end entity including a first client software application for connecting to the publish/subscribe broker and for publishing control data via a control data channel for a device management of the end-user devices, and wherein
    the end-user devices include a second client software application for connecting to the publish/subscribe broker for subscribing to said control data channel and for receiving the control data, and for publishing device data and action data as instructed by the control data,
    wherein each end-user device subscribes to at least one control data channel for receiving execute commands for its device management, and each end-user device publishes the device data via a device data channel and action data via an action data channel.

2. The system according to claim 1, wherein the service provider network is a network service provider network for providing Internet services and which provides the device management of the end-user devices.

3. The system according to claim 2, wherein the publish/subscribe broker is provided by a network service provider operating the network service provider network.

4. The system according to claim 2, wherein the publish/subscribe broker is provided by an Internet service provider.

5. A system comprising a multitude of end-user devices coupled via a broadband connection with a service provider network, wherein the system comprises further:
    a publish/subscribe broker adapted to communicate with the multitude of end-user devices and at least a first back-end entity coupled with the service provider network, the first back-end entity including a first client software application for connecting to the publish/subscribe broker and for publishing control data via a control data channel for a device management of the end-user devices, and wherein
    the end-user devices include a second client software application for connecting to the publish/subscribe broker for subscribing to said control data channel and for receiving the control data, and for publishing device data and action data as instructed by the control data;
    further comprising a second backend entity including a third client software application for connecting to the publish/subscribe broker, which second backend entity subscribes to device data, control data and action data of the end-user devices to maintain an inventory of the multitude of end-user devices, but does not publish control data for the end-user devices.

6. The system according to claim 5, wherein the second back-end entity is a server provided by a manufacturer or a vendor of the end-user devices.

7. The system according to claim 3, wherein the first back-end entity is a server provided by the network service provider.

8. The system according to claim 1, wherein the end-user device management includes upgrading to a new firmware or middleware version, installing, updating or uninstalling of a software application, execute a program or script file, executing a structured query on the end-user device configuration or on status data, or resetting or rebooting the end-user devices.

9. The system according to claim 1, wherein the end-user devices validate a back-end entity authorization through a control data signature.

10. A system comprising a multitude of end-user devices coupled via a broadband connection with a service provider network, wherein the system comprises further
 a publish/subscribe broker adapted to communicate with the multitude of end-user devices and at least a first back-end entity coupled with the service provider network, the first back-end entity including a first client software application for connecting to the publish/subscribe broker and for publishing control data via a control data channel for a device management of the end-user devices, and wherein
  the end-user devices include a second client software application for connecting to the publish/subscribe broker for subscribing to said control data channel and for receiving the control data, and for publishing device data and action data as instructed by the control data, and
  the second client software application is started on each end-user device on startup of the respective end-user device and establishes a connection to the publish/subscribe broker for the end-user device by using a preconfigured uniform resource locator.

11. The system according to claim 10, wherein the service provider network is a network service provider network for providing Internet services and which provides the device management of the end-user devices.

12. The system according to claim 10, wherein the publish/subscribe broker is provided by a network service provider operating the network service provider network.

13. The system according to claim 10, wherein the publish/subscribe broker is provided by an Internet service provider.

14. The system according to claim 10, wherein each end-user device subscribes to at least one control data channel for receiving execute commands for its device management and wherein each end-user device publishes the device data via a device data channel and action data via an action data channel.

15. The system according to claim 10, comprising a second backend entity including a third client software application for connecting to the publish/subscribe broker, which second backend entity subscribes to device data, control data and action data of the end-user devices to maintain an inventory of the multitude of end-user devices, but does not publish control data for the end-user devices.

16. The system according to claim 15, wherein the second back-end entity is a server provided by a manufacturer or a vendor of the end-user devices.

17. The system according to claim 12, wherein the first back-end entity is a server provided by the network service provider.

18. The system according to claim 10, wherein the end-user device management includes upgrading to a new firmware or middleware version, installing, updating or uninstalling of a software application, execute a program or script file, executing a structured query on the end-user device configuration or on status data, or resetting or rebooting the end-user devices.

19. The system according to claim 10, wherein the end-user devices validate a back-end entity authorization through a control data signature.

20. A end-user device coupled via a broadband connection with a service provider network comprising a publish/subscribe broker adapted to communicate with said end-user device, the end-user device comprising:
 a device management for receiving, via a control data channel, control data published by a first back-end entity coupled with the service provider network, said first back-end entity including a first client software application for connecting to the publish/subscribe broker,
 a second client software application for connecting to the publish/subscribe broker for subscribing to said control data channel and for receiving the control data, and for publishing device data and action data as instructed by the control data,
 a receiver for receiving execute commands for its device management via at least one control data channel to which the end-user device has subscribed,
 a publishing module for publishing the device data via a device data channel and action data via an action data channel.

* * * * *

UNITED STATES PATENT AND TRADEMARK OFFICE
CERTIFICATE OF CORRECTION

PATENT NO. : 9,614,914 B2
APPLICATION NO. : 14/356904
DATED : April 4, 2017
INVENTOR(S) : Dirk Van De Poel, Patrick Goemaere and Kurt Jonckheer It is certified that error appears in the above-identified patent and that said Letters Patent is hereby corrected as shown below:

On the Title Page

Column 1, under item (71) Lines 1-2; replace "Issy de Moulineaux (FR)" with --Issy Les Moulineaux (FR)--
Column 1, item (73) Lines 1-2; replace "Issy Lew Moulineaux (FR)" with --Issy Les Moulineaux (FR)--
Column 2, under item (57) Line 7; replace "MAC address" with --MAC address.--

In the Claims

At Column 12, Line 58; replace "backend" with --back-end--

Signed and Sealed this
Third Day of October, 2023

Katherine Kelly Vidal
Director of the United States Patent and Trademark Office